United States Patent [19]

Muck et al.

[11] Patent Number: 4,642,886

[45] Date of Patent: Feb. 17, 1987

[54] METHOD FOR BALANCING WOUND ROTORS OF ELECTRICAL MACHINES

[75] Inventors: Jürgen Muck, Veitshöchheim; Hans Fischer, Wurzburg; Richard Krämer, Marksteft, all of Fed. Rep. of Germany

[73] Assignee: Siemens Aktiengesellschaft, Berlin and Munich, Fed. Rep. of Germany

[21] Appl. No.: 634,541

[22] Filed: Jul. 26, 1984

[30] Foreign Application Priority Data

Aug. 1, 1983 [DE] Fed. Rep. of Germany ....... 3327744

[51] Int. Cl.$^4$ ............................................. H02K 15/16
[52] U.S. Cl. ....................................... 29/598; 29/407; 29/593; 73/470; 74/573 R; 310/42; 310/51; 310/261
[58] Field of Search ......................... 29/598, 407, 593; 310/51, 42, 261; 73/470, 469; 74/573 R

[56] References Cited

U.S. PATENT DOCUMENTS

| 2,447,383 | 8/1948 | Wightman | 74/573 X |
| 2,547,764 | 4/1951 | Lindenberg et al. | 73/470 |
| 4,060,009 | 11/1977 | Wyman | 74/573 R X |

FOREIGN PATENT DOCUMENTS

| 2363594 | 6/1975 | Fed. Rep. of Germany | 73/470 |
| 80405 | 8/1955 | Netherlands | 74/573 R |

Primary Examiner—Carl E. Hall
Attorney, Agent, or Firm—Kenyon & Kenyon

[57] ABSTRACT

In a method for the insertion of balancing weights in pockets of an insulating end disc of an electrical machine rotor, only balancing weights of the same weight value are utilized. The balancing weights are distributed over the weight-receiving pockets on both sides of a plane extending through a determined balancing position and the axis of rotation of the rotor. The inserted balancing weights are secured in their respective pockets by means of respective detent closures.

15 Claims, 5 Drawing Figures

METHOD FOR BALANCING WOUND ROTORS OF ELECTRICAL MACHINES

BACKGROUND OF THE INVENTION

This invention relates to a method for balancing electrical machine rotors which are wound with wire windings.

As described in German Patent No. 1,763,447, an electrical machine such as a motor or generator has a rotor with an end disc provided with holding vanes for the protection of the coil heads against centrifugal force. The holding vanes are formed at the circumference or periphery of the end disc and each have a drill-hole extending parallel to the axis of rotation of the rotor for receiving a balancing weight. In the assembly of the rotor, the rotor is provided at each end face with an electrically insulating end disc. Upon the winding of an electrical wire about the rotor structure, the position and magnitude of an any imbalance in the rotor is determined by the use of a balancing machine. A section of lead wire is then cut from a lead wire reel, the length of the section corresponding to the magnitude of the determined imbalance. The section of lead wire is subsequently inserted with a tight fit into a hole at the position determined by the balancing machine.

An object of the present invention is to provide a simplified method for balancing the wound rotors of electrical machines, thereby expediting the production process.

An additional object of the present invention is to provide such a method which is readily adaptable to extensive automation of the balancing process. The method of the present invention is intended to be employed with automatic handling machines.

SUMMARY OF THE INVENTION

A method in accordance with the present invention is utilizable with an electrical machine having a rotor wound with wire windings, the rotor having a lamination stack and an insulating disc secured to an end face of the lamination stack and provided with a multiplicity of integrally formed pockets for receiving and holding a balancing weight. In accordance with the method of the present invention, a multiplicity of balancing weights seatable in the pockets on the insulating disc are provided, the balancing weights having a common first weight value. A second weight value and a balancing position on the insulating disc are then determined, the magnitude of the second weight value being such that a disposition of a weight having that value at the determined balancing position would balance the rotor. At least one of the balancing weights is then seated in a pocket on one side of a plane extending through the balancing position and the axis of rotation of the rotor. At least one other of the balancing weights is seated in a pocket on the other side of the plane, so that the distribution of the balancing weights with respect to the insulating disc at least substantially approximates a disposition of a weight of the second weight value at the determined balancing position.

In accordance with a feature of the present invention, locking means are provided on the balancing weights and the pockets for securing the balancing weights in respective pockets upon the termination of a seating or insertion operation.

In accordance with a preferred embodiment of the present invention, each of the pockets defines a respective insertion path along which a balancing weight is moved during a seating thereof in such pocket, and the locking means includes on each of the pockets a detent with a projection extending into the respective insertion path. Each of the balancing weights has a locking surface engageable with the projection of a detent to lock the respective balancing weight in the respective pocket. The detent is advantageously an integrally formed resilient part of the insulating disc. The detent has a first camming surface and each of the balancing weights has a second camming surface, the camming surface of the detent being engageable with the camming surface of a balancing weight during a seating operation, whereby the projection of the respective detent is shifted temporarily out of the respective insertion path and shifts back thereinto upon completion of the seating operation.

In accordance with an alternative embodiment of the present invention each of the balancing weights is provided with a detent having an outwardly extending projection. Each of the pockets has a locking surface engageable with the projection of each detent to lock the respective balancing weight in the respective pocket upon completion of a seating operation.

In accordance with a particular feature of the present invention, the insulating disc is formed at its periphery with a multiplicity of radially extending slots defining a multiplicity of radially extending fingers. The pockets are integral with respective fingers.

A balancing device operating in accordance with the method of the present invention can be greatly simplified by virtue of the facts that the same feeding arrangement may be used regardless of the determined balancing position and required balancing weight and that only one unit type of balancing weight is required. In accordance with the present invention, balancing is achieved by varying the numbers and positions of the pockets occupied by the uniform balancing weights. If the measured balancing position does not coincide precisely with a pocket, an adequately precise balance can nevertheless be achieved by distributing the weights on both sides of the pocket nearest the measured balancing position asymmetrically with respect to that pocket.

The provision of locking means in accordance with the present invention ensures the fixation or securing of the balancing weights in the pockets substantially simultaneously with the insertion of the balancing weights. The automatic locking, implemented by means of a snap closure, is particularly simple from a production point of view and nevertheless ensures a secure seating of the weights in the pockets. Each pocket is advantageously provided with a detent dog and with a detent projection which extends partially into the insertion path defined by the pocket. The projection is pushed out of the insertion path during the seating of a balancing weight and is automatically returned into the path upon the completed insertion of the balancing weight. Alternatively, a detent projection may be provided on each balancing weight, which projection engages a cooperating recess on a pocket upon the completed insertion of the balancing weight thereinto. In either embodiment, the projection is provided with a camming surface for causing the temporary shifting of the projection in a direction substantially perpendicular to the direction of insertion of the balancing weight into the respective pocket or holder.

In accordance with a specific feature of the present invention, the detent projections and camming surfaces are formed integrally at the pockets which in turn are injection molded integrally with radially extending peripheral fingers of the plastic insulating end disc of the electrical machine rotor.

The balancing operation, in particular the insertion of the balancing weights into the pockets, is simplified if, in accordance with a feature of the present invention, the pockets are designed with an insertion direction extending parallel to the axis of rotation of the rotor. In the case of poorly accessible miniature motor rotors, the pockets advantageously have an insertion direction extending radially with respect to the axis of rotation of the rotor.

DETAILED DESCRIPTION

Figure 1:
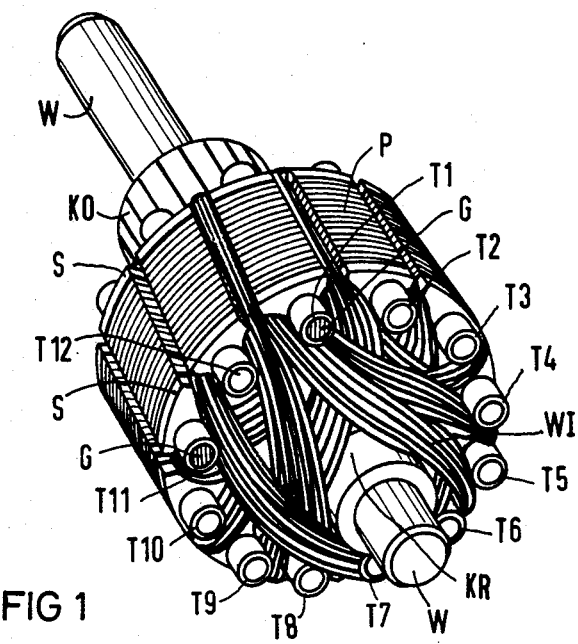
FIG. 1 is a perspective top view of an electrical machine rotor having an insulating end disc provided with integrally molded pockets for receiving balancing weights.

As illustrated in FIG. 1, a wound rotor of an electrical miniaturized commutator motor comprises a laminated stack P mounted on a shaft W in juxtaposition to a commutator KO. The laminated stack P is longitudinally slotted over its circumference or periphery to form a multiplicity of radially extending teeth, a rotor windings WI being wound in the slots.

Prior to the wrapping of the rotor winding WI, an insulating end disc S is disposed at each end face of the laminated stack P. The plastic insulating end disc S is pushed over shaft W with an integrally molded collar KR. Insulating end disc S is provided with a multiplicity of radially extending recesses or slots which correspond to the slot openings at the end face of laminated stack P. The radially extending slots on the insulating end disc define a multiplicity of radially extending strips or fingers which engage respective end laminations in the regions of the teeth thereof. End disc S is held in position, on the one hand, by collar KR and, on the other hand, by the coil heads of winding WI.

A multiplicity of holders or pockets T1-T12 are integrally formed on the peripheral fingers of insulating end disc S, the holders or pockets being disposed in a circular array concentric with the axis of rotation of the rotor. In accordance with the embodiment of the present invention illustrated in FIG. 1, pockets T1-T12 define respective insertion paths extending longitudinally, i.e., parallel to the axis of rotation of shaft W.

Figure 2:
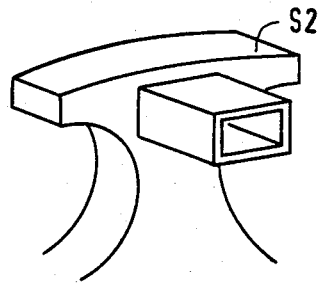
FIG. 2 is a perspective view of a portion of a rotor similar to that of FIG. 1, showing a prismatic pocket or holder for receiving a balancing weight.
Figure 3:
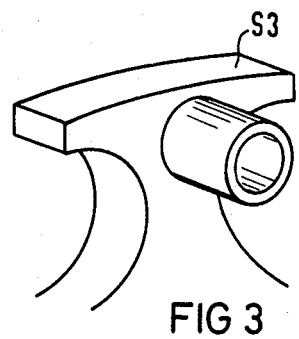
FIG. 3 is a perspective view similar to FIG. 2 showing a cylindrical pocket for receiving a balancing weight.

As illustrated in FIGS. 2 and 3, the pockets formed at the periphery of the insulating end disc S may be rectangular or circular in cross section.

FIG. 1 shows two similar balancing weights G of equal weight value inserted into pockets T1 and T11, these pockets flanking pocket T12 which is unoccupied. In this case a balancing device has determined a balancing position which coincides with pocket T12. The disposition of a pair of equal sized weights G in pockets T1 and T11 on both sides of pocket T12 is equivalent to the disposition of a greater weight in pocket T12. If the balancing device were to detect an imbalance which could be rectified by the placement of a weight at a position between pockets T11 and T12, balancing could be achieved, for example, in accordance with the present invention, by disposing one weight G in pocket T1 and another weight G in pocket T10. In a different case, pockets T1, T2, and T9-T11 could be occupied by respective balancing weights G.

Figure 4:
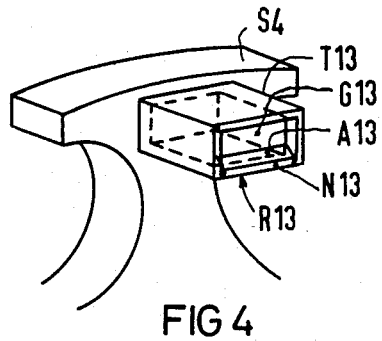
FIG. 4 is a partially schematic perspective view similar to FIGS. 2 and 3, showing another weight-receiving pocket in accordance with the present invention.
Figure 5:
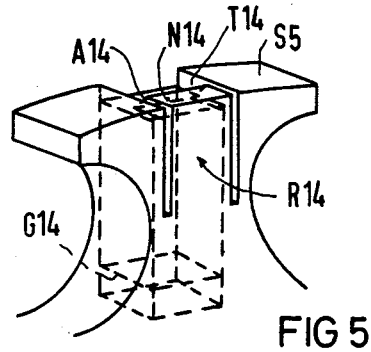
FIG. 5 is a partially schematic perspective view similar to FIGS. 2-4, showing yet another weight-receiving pocket.

FIGS. 4 and 5 show balancing weights G13 and G14 which are inserted into an axially extending pocket T13 and a radially extending pocket T14, respectively. The embodiment of FIG. 5 is particularly advantageous in the case of a motor which is placed in a location in which access in the axial direction is restricted. As illustrated in FIG. 5, the weight-receiving pocket is accessible from the side of the lamination stack and is disposed directly in the wall of the insulating end disc S5.

Pockets or holders T13 and T14 are provided with integrally formed resilient detent dogs R13 and R14, respectively. Detents R13 and R14 are provided with respective projections N13 and N14 which extend in a transverse or radial direction into respective insertion paths defined by the respective pockets. Projections N13 and N14 are provided with respective inclined camming surfaces or chamfers A13 and A14 which engage a lateral surface of a balancing weight upon the insertion thereof into the respective pocket.

Upon the insertion of a balancing weight into pocket T13 or T14, camming surface A13 or A14 causes the respective projection N13 or N14 to shift laterally out of the insertion path. Upon the completion of the seating process, the detent R13 or R14 snaps back into its original position wherein the respective projection N13 or N14 extends into the insertion path of the pocket T13 or T14 and engages a cooperating locking surface, e.g., an end face, of the inserted balancing weight.

What is claimed is:

1. A method for balancing an electrical machine rotor wound with wire windings, said rotor having a lamination stack and an insulating disc secured to an end face of said lamination stack and provided with a multiplicity of integrally formed pockets for receiving and holding a weight, said method comprising the steps of:
   providing a multiplicity of balancing weights seatable in the pockets on the insulating disc, said balancing weights having a common first weight value;
   determining a second weight value and a balancing position on said insulating disc at which disposition of a weight having said second weight value would balance the rotor; and
   seating at least one of said balancing weights in a pocket on one side of a plane extending through said balancing position and the axis of rotation of said rotor and seating at least one other of said balancing weights in a pocket on the other side of said plane, so that the distribution of the balancing weights with respect to said insulating disc at least substantially approximates a disposition of a weight of said second weight value at said balancing position.

2. The method defined in claim 1, further comprising the step of providing locking means on said balancing weights and said pockets for securing said balancing weights in respective pockets upon seating of said balancing weights therein.

3. The method defined in claim 2 wherein each of said pockets defines a respective path along which a balancing weight is moved during a seating thereof in such pocket, said locking means including on each of said pockets a detent with a projection extending into the respective path, each of said balancing weights having a locking surface engageable with said projection to lock the respective balancing weight in the respective pocket.

4. The method defined in claim 3 wherein said detent is an integrally formed resilient part of said insulating disc, said detent having a first camming surface and each of said balancing weights having a second camming surface, said first camming surface being engageable with said second camming surface of a balancing weight during a seating thereof, whereby said projection is shifted temporarily out of said path and shifts back into said path upon the completion of the seating operation.

5. The method defined in claim 3 or 4 wherein the paths defined by said pockets extend parallel to the axis of rotation of said rotor.

6. The method defined in claim 3 or 4 wherein the paths defined by said pockets extend perpendicularly to the axis of rotation of said rotor.

7. The method defined in claim 2, wherein said locking means includes on each of said balancing weights a detent with an outwardly extending projection, each of said pockets having a locking surface engageable with said projection to look the respective balancing weight in the respective pocket upon completion of a seating operation.

8. The method defined in claim 7 wherein each detent is an integrally formed resilient part of the respective balancing weight.

9. The method defined in claim 1, 2, 7 or 8 wherein each of said pockets defines a respective insertion path along which a balancing weight is moved during a seating thereof in such pocket, the paths defined by said pockets extending. parallel to the axis of rotation of said rotor.

10. The method defined in claim 1, 2, 7 or 8 wherein each of said pockets defines a respective insertion path along which a balancing weight is moved during a seating thereof in such pocket, the paths defined by said pockets extending perpendicularly to the axis or rotation of said rotor.

11. The method defined in claim 1, 2, 3 or 7 wherein said pockets are circular in cross section.

12. The method defined in claim 1, 2, 3 or 7 wherein said pockets are rectangular in cross section.

13. The method defined in claim 1, 2, 3 or 7 wherein said insulating disc is formed at its periphery with a multiplicity of radially extending fingers, said pockets being integral with respective ones of said fingers.

14. The method defined in claim 1, 2, 3 or 7 wherein, upon completion of said step of seatings said balancing weights are distributed asymmetrically with respect to said plane.

15. The method defined in claim 1 wherein said balancing weights are inserted in said pockets simultaneously by means of a feeding arrangement with a plurality of feed channels.

* * * * *